(12) United States Patent
Backmann et al.

(10) Patent No.: US 12,202,186 B2
(45) Date of Patent: *Jan. 21, 2025

(54) APPARATUS FOR PRODUCING FILMS STRETCHED IN-LINE

(71) Applicant: Windmöller & Hölscher KG, Lengerich/Westf. (DE)

(72) Inventors: Martin Backmann, Lengerich (DE); Markus Bussmann, Essen (DE); Karsten Golubski, Haltern am See (DE)

(73) Assignee: Windmöller & Hölscher KG, Lengerich/Westf. (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/407,482

(22) Filed: Aug. 20, 2021

(65) Prior Publication Data

US 2021/0379810 A1 Dec. 9, 2021

Related U.S. Application Data

(63) Continuation of application No. 16/737,400, filed on Jan. 8, 2020, now Pat. No. 11,123,909, which is a
(Continued)

(30) Foreign Application Priority Data

Jul. 19, 2013 (DE) ...................... 10 2013 012 134.5

(51) Int. Cl.
| | |
|---|---|
| *B29C 48/10* | (2019.01) |
| *B29C 48/00* | (2019.01) |
| *B29C 48/32* | (2019.01) |
| *B29C 48/35* | (2019.01) |
| *B29C 48/88* | (2019.01) |

(Continued)

(52) U.S. Cl.
CPC .......... *B29C 48/0018* (2019.02); *B29C 48/10* (2019.02); *B29C 48/32* (2019.02);
(Continued)

(58) Field of Classification Search
CPC ..... B29C 48/0018; B29C 48/10; B29C 48/28; B29C 48/32; B29C 48/88; B29C 48/885;
(Continued)

(56) References Cited

U.S. PATENT DOCUMENTS

| | | |
|---|---|---|
| 3,474,160 A | 10/1969 | Doering |
| 3,657,974 A | 4/1972 | Hedrich et al. |

(Continued)

FOREIGN PATENT DOCUMENTS

| | | |
|---|---|---|
| AT | 311666 B | 3/1973 |
| DE | 1548243 A1 | 4/1969 |

(Continued)

*Primary Examiner* — Xiao S Zhao
*Assistant Examiner* — Joseph S Leyson
(74) *Attorney, Agent, or Firm* — Dilworth & Barrese, LLP

(57) ABSTRACT

The invention relates to an apparatus for producing tubular films stretched in-line by blow molding with an extruder, a film blowing line, a lay-flat unit, an oscillating haul-off unit, and a stretching line for monoaxially stretching the film laid flat in machine direction. According to the invention, the stretching line is arranged above the extruder between the lay-flat unit and the oscillating haul-off unit.

14 Claims, 2 Drawing Sheets

Related U.S. Application Data continuation-in-part of application No. 14/905,577, filed as application No. PCT/EP2014/001528 on Jun. 5, 2014, now abandoned.

(51) Int. Cl.
*B29C 48/91* (2019.01)

(52) U.S. Cl.
CPC .......... *B29C 48/35* (2019.02); *B29C 48/9105* (2019.02); *B29C 48/913* (2019.02); *B29C 2945/76464* (2013.01)

(58) Field of Classification Search
CPC ... B29C 48/89; B29C 48/903; B29C 48/9105; B29C 48/9125; B29C 48/913; B29C 48/92; B29C 2948/92647; B29C 2948/92704; B29C 2948/92942; B29C 55/06
See application file for complete search history.

(56) References Cited

U.S. PATENT DOCUMENTS

| | | | |
|---|---|---|---|
| 3,804,572 A | 4/1974 | Upmeier | |
| 4,113,935 A | 9/1978 | Schippers et al. | |
| 4,464,318 A | 8/1984 | Upmeier et al. | |
| 5,281,375 A * | 1/1994 | Konermann | B29C 48/10 425/141 |
| 5,288,441 A | 2/1994 | Collins | |
| 5,441,395 A | 8/1995 | Planeta | |
| 5,458,841 A | 10/1995 | Shirrell | |
| 5,912,022 A | 6/1999 | Sensen et al. | |
| 6,241,502 B1 | 6/2001 | Baeumer et al. | |
| 11,123,909 B2 * | 9/2021 | Backmann | B29C 55/28 |
| 2012/0299209 A1 | 11/2012 | Trommelen et al. | |
| 2015/0151482 A1 | 6/2015 | Gandelheidt | |

FOREIGN PATENT DOCUMENTS

| | | |
|---|---|---|
| DE | 2 146 266 A1 | 6/1973 |
| DE | 1778432 B2 | 4/1974 |
| DE | 2328639 A1 | 1/1975 |
| DE | 2607102 A1 | 8/1977 |
| DE | 30 02 903 A1 | 8/1981 |
| DE | 33 24 978 A1 | 1/1985 |
| DE | 35 08 626 C1 | 2/1986 |
| DE | 692 08 002 T2 | 6/1996 |
| DE | 198 40 043 C1 | 12/1999 |
| DE | 10 2009 046 592 A1 | 5/2011 |
| DE | 10 2011 018 320 A1 | 10/2012 |
| EP | 2 277 681 A1 | 1/2011 |

* cited by examiner

APPARATUS FOR PRODUCING FILMS STRETCHED IN-LINE

BACKGROUND OF THE INVENTION

The present invention relates to an apparatus for producing tubular films stretched in-line by blow molding according to the description herein.

For producing tubular films by blow molding, blown film extrusion lines usually are employed, which are in use already for a long time. To such lines plastics are supplied in granular form, which are then plasticised in extruders under high pressures to obtain a viscous mass. This mass, which due to the pressure has a high temperature, is formed ring-shaped in a blowing head and escapes from the blowing head through a ring nozzle. Directly after leaving the ring nozzle, the mass already forms a film tube. This film tube can, however, be varied in its diameter, as it is not yet cooled completely. In general, the diameter is increased by blowing compressed air into the interior space of the film tube. To ensure that the film tube always has a constant diameter, it is guided at a distance to or directly along film guiding elements. In the field of blown film extrusion lines, this arrangement of the film guiding elements is referred to as calibration cage.

After passing through the calibration cage, the film tube can be laid flat in an oscillating haul-off unit, be installed and subsequently be stretched monoaxially in machine direction in a stretching line.

By stretching thermoplastic films, their properties can be varied selectively. Such properties for example are the transparency or the strength. Such stretching, which can be effected in transverse and/or longitudinal direction of the film web, can be performed in-line directly after the extrusion process. The process of elongating or stretching thermoplastic films is described for example in WO 2006/063641 A1 and in WO 2011/057918 A1.

In the production of tubular films, film thickness profile control systems with segmented control zones are used. By means of these systems, the film thickness profiles can be controlled such that the thickness deviations are as small as possible over the entire tube circumference.

From DE 39 411 85 A1, for example, a method for controlling the film thickness of tubular films from film blowing lines with downstream axial or biaxial stretching of the inflated tubular films in an oven is known, so that an end film is obtained which has as little deviations in thickness as possible.

During longitudinal stretching in a stretching line, the film is elongated in machine direction corresponding to the degree of stretching and the film thickness thereby is reduced. At the same time, the film necks in transverse direction, whereby the width of the film is reduced. This necking results in that the stretched film becomes thicker less and less from the film center in direction of the film edges, although it previously has been controlled to a thickness as constant as possible by blow molding. This increase in thickness is particularly pronounced at the film edge regions. During subsequent winding of the film, this causes a build-up of edges in film thickness. The film web is elongated more and more at the edges with increasing roll diameter.

To produce films with a thickness profile as uniform as possible, as they are required in particular for printing or laminating, the film edges which do not correspond to the desired thickness profile must be cut away. Due to this cutting away referred to as trimming, a large part of the film width however gets lost. Thus, on each side of the film up to about 200 mm are lost by trimming, i.e. cutting away.

From EP 2 277 681 B1 a generic method has become known, in which the film thickness profile of the tubular film produced in the film blowing line is controlled such that due to stretching a film with a thickness profile with deviations as small as possible from the mean film thickness across the entire film width is produced. For this purpose, a tubular film is produced by a film blowing process, which has two opposite thin spots. When the tubular film is laid flat, care now is taken that the thin spots are located in the film edge region and that the stretched film then has a thickness profile with deviations as small as possible from the mean film thickness. The thin spots incorporated selectively hence compensate the thickenings in the edge region obtained later on during stretching, so that a uniform film thickness extending up into the edge region should be obtained.

In the known apparatuses for producing tubular films stretched in-line by blow molding, the oscillating haul-off unit above the extruder usually is provided downstream of the lay-flat unit. The tubular film usually is passed on from the haul-off unit to the stretching line arranged beside the extruder and is stretched there correspondingly, before it is wound up on a winder. Such construction can be taken for example from EP 2 277 681 B1.

In this arrangement it is disadvantageous, however, that at the time at which it is introduced into the stretching line, the tubular film laid flat, installed and hauled off via the oscillating haul-off unit already has cooled to such an extent that for stretching it must still be heated to an operating temperature advantageous for stretching by means of at least one heating roller. This in particular has energetic disadvantages, as here the heating energy must be provided once again.

SUMMARY OF THE INVENTION

It therefore is the object of the invention to optimize a generic apparatus for producing tubular films stretched in-line by blow molding, in particular in energetic terms, i.e. to lower the energy demand for the production.

According to the invention, this object is solved by an apparatus with the combination of features herein. For this purpose, an apparatus for producing tubular films stretched in-line by blow molding includes an extruder, a film blowing line, a lay-flat unit, an oscillating haul-off unit, and a stretching line for monoaxially stretching the film laid flat in machine direction. However, the stretching line is arranged above the extruder between the lay-flat unit and the oscillating haul-off unit. This means that the film originating from the extruder still is quite warm after being laid flat correspondingly in the lay-flat unit, until it is introduced into the stretching line. At least the first heating roller can be saved thereby. The film still warm can be stretched in the desired way by means of the stretching unit. For temperature control, however, further heating still is necessary. This heating, however, only serves for exactly adjusting the temperature, as the tubular film coming from the extruder and the lay-flat unit substantially still is close to the desired processing temperature.

Further advantageous aspects of the invention can be taken from the description herein.

Advantageously, the stretching line together with the haul-off unit provided downstream in conveying direction is rotatably mounted on a platform above the lay-flat unit.

Advantageously, beside the stretching line further components, such as electrical converters and/or electric feed components and/or drives, also are arranged on the platform. The arrangement is chosen such that here a weight compensation is effected on the platform.

For the central supply of water and electricity above the platform, slip rings and a rotary water lead-through can be provided. Advantageously, the communication cables also can be guided onto the platform as data line.

Above the platform, observation systems in the form of cameras advantageously are arranged at various positions. Here, a respective ascent to the platform by the operating personnel can be omitted.

The rollers of the stretching line advantageously are driven and temperature-controlled individually. The rollers form at least one stretching nip, wherein the same advantageously is adjustable. The rollers of the stretching line can have different diameters, wherein the stretching rollers have a comparatively smaller diameter.

Advantageously, the rollers of the stretching line can have a non-stick coating.

Particularly advantageously, the rollers of the stretching line can be designed such that by the advance of at least one roller a stretching force of 100 N to 1000 N can be applied.

For temperature control of the rollers of the stretching unit, at least two temperature control circuits, namely a heating circuit and a cooling circuit, can be present. By means of the temperature-controlled rollers, the blown film guided through the stretching unit can be heated up to a temperature which lies at least 10° C. below the glass temperature of the tubular film material. According to a further preferred aspect it is essential that the temperature-controlled rollers have a temperature uniformity of <5° C., preferably <1° C., across the roller width.

Particularly advantageously, nip rollers also are provided in the stretching unit, which preferably have a surface quality other than the nipped rollers.

For saving energy, intermediate circuit couplings each can be provided between the driving and braking rollers in the stretching unit, which preferably are formed as electric couplings.

Instead of the reversing device downstream of the stretching unit, it might also be provided that the same is formed in the stretching device itself in that the annealing rollers in the stretching device are formed to be reversing at the upper region of the stretching device.

BRIEF DESCRIPTION OF THE DRAWINGS

Further features, details and advantages of the invention will be explained in detail with reference to an exemplary embodiment illustrated in the accompanying drawings, in which.

DESCRIPTION OF THE PREFERRED EMBODIMENTS

Figure 1:
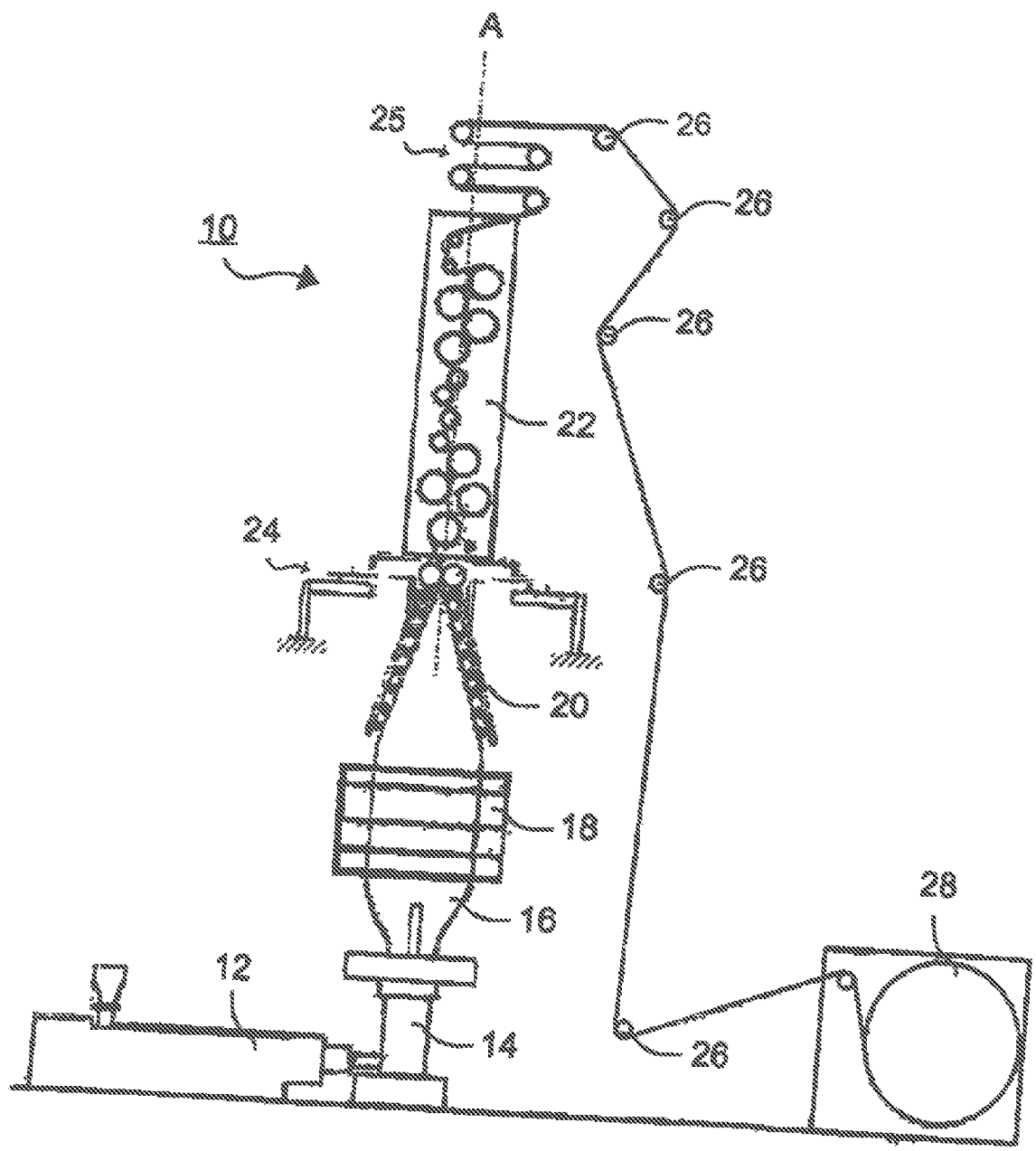
FIG. 1 shows a film blowing line with downstream stretching unit according to an embodiment of the present invention.

FIG. 1 shows an apparatus 10 according to the invention for producing tubular films stretched in-line by blow molding. Via a dosing device, the plastic granules to be processed are supplied to an extruder 12, molten in the same, homogenized and supplied to a film blowing head 14. The film blowing head 14 includes a ring nozzle from which the extruded plastic mass exits. Through the film blowing head cooling air is supplied for inflating a tubular film 16. During the blowing operation, the tubular film 16 is kept in shape by a calibration head 18.

After solidification of the plastic material, the tubular film 16 is laid flat in a lay-flat unit 20 and after the lay-flat unit supplied directly to a stretching unit 22 arranged above the film blowing head 14. The stretching unit is arranged on a platform 24 which lies above the lay-flat unit 20. Here, the still warm tubular film 16 laid flat as supplied from the lay-flat unit 20 is stretched monoaxially in machine direction. The correspondingly stretched film then is hauled off continuously via a haul-off unit 25 arranged above the stretching unit 22 and supplied to a winder 28 via various rollers 26 and wound up to form film rolls.

In the stretching unit 22 a stretching force of about 100 N to 1000 N is applied due to the advance of a roller. The rollers are at least partly heated, in order to smooth the tubular film 16 during stretching.

In the stretching unit 22 shown here, four stretching nips are shown. Usually, a corresponding stretching unit must have at least one stretching nip. In the design variant shown here, all rollers of the stretching unit 22 are driven and temperature-controlled individually. As indicated here in FIG. 1, the rollers each have a different diameter, wherein the stretching rollers have a comparatively smaller diameter. In a manner not shown here, nip rollers, i.e. counter rollers, also can be provided in the stretching unit 22.

Advantageously, the rollers in the stretching unit 22 have a non-stick coating. The respective stretching nips likewise can be adjustable advantageously. Usually, a temperature of <10° C. below the glass temperature is adjusted via the heating rollers. In one design variant, four rollers without haul-off nip with a wrap angle of more than 60° or preferably even more than 90° can be provided in the stretching unit.

In the exemplary embodiment according to FIG. 1 as shown here, the stretching unit 22 is set up vertically. According to an alternative design variant, which is not shown here, it can also be mounted transversely on the platform 24.

In accordance with the invention, the torque of the rollers in the stretching unit is adjusted such that a certain controlled web tension factor is set. In a manner not shown here, one knife or several knives are present above the stretching unit, which perform the cut for the so-called trimming. Here, the edge regions which due to stretching are formed comparatively thicker than the middle regions are cut away. However, to minimize the loss caused by cutting off the thickened edge regions, a profile control for a more uniform film thickness across the entire region of the film thickness advantageously is provided in the apparatus for producing tubular films stretched in-line as shown in FIG. 1, as it has already been described in detail for example in the German Patent Application 10 2013 007 669. For carrying out such profile control, a profile measurement at the correspondingly necessary points, as they have been described for example in DE 10 2013 007 669, also is to be provided in a manner not shown in detail in FIG. 1.

Figure 2:
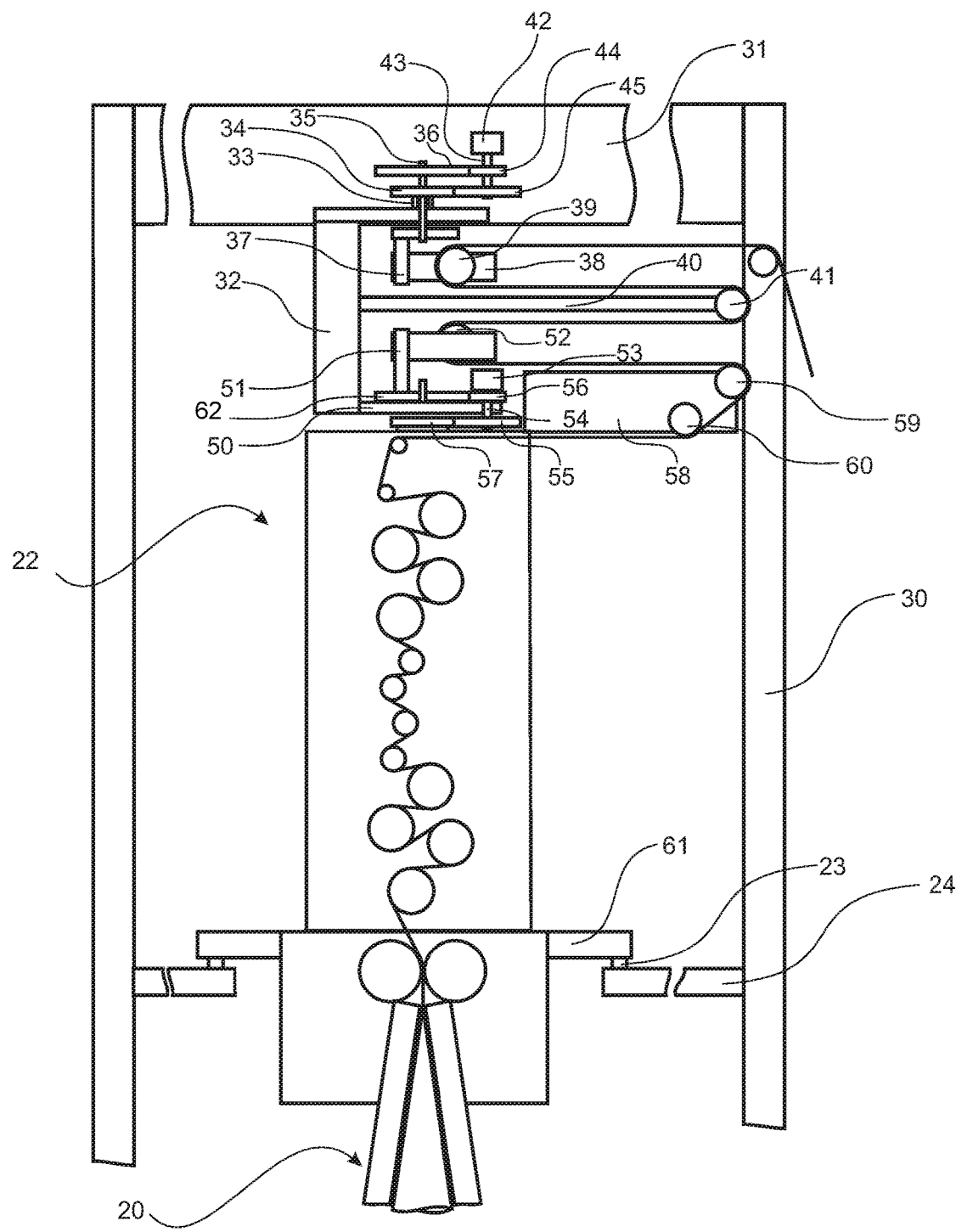
FIG. 2 is an enlargement in greater detail, of an upper portion of FIG. 1.

FIG. 2 shows a detailed illustration of the functioning of an embodiment of the stretching unit 22 and the haul-off unit 25. The supporting element shown here is a tower 30, which is supported in particular on the floor of a production hall. The tower comprises a traverse 31, on which an arrangement of the haul-off unit 25 can be suspended, as will be described in more detail below. A frame 32, preferably designed as C-shaped, is rotatably mounted on this cross member 31. To rotate the frame 32, a hollow shaft 33 is arranged thereon, a gear wheel 34 being connected in a rotationally fixed manner to the hollow shaft 34. A frame 40, which extends in the horizontal direction and carries a deflection roller 41, is arranged on the frame 32.

A further shaft 35, which carries a gear wheel 36, extends through the hollow shaft 33 and the gear wheel 34, the shaft 35 and the gear wheel 36 being connected to one another in a rotationally fixed manner. The shaft 35 is connected to a frame 37 in a non-rotatable manner, the frame 37 being rotatably mounted on the cross member 31. The holder 38 of the frame 37 carries the turning bar 39.

A motor 42 is fastened to the cross member 31 and carries two gearwheels 44 and 45 on its drive shaft 43, the gearwheel 44 engaging with the gearwheel 36 and the gearwheel 45 meshing with the gearwheel 34. The ratios of the gear stages formed in this way are selected such that the frame 32 is always pivoted out at a double angle of rotation in comparison with the frame 37, the two frames not being rotated relative to one another in a zero position.

The frame 32 carries on its lower leg 50 a further frame 51 which is rotatably mounted with respect to the leg 50. A further turning bar 52 is mounted in this frame 51. In addition, the leg 50 carries a second motor 53 which carries two gears 55 and 56 on its drive shaft 54. The gear 55 meshes with the gear 57, which is connected in a rotationally fixed manner to the stretching unit 22. The gear 56, on the other hand, moves the gear 62, which is connected to the frame 51. The ratios of the gear stages formed in this way are selected such that the frame 51 is always pivoted out at a double angle of rotation in comparison with the stretching unit 22, the frame and the stretching unit not being rotated relative to one another in a zero position. In this zero position, the aforementioned elements are also not rotated relative to frame 32 or frame 37. The motor 42 and the motor 53 are controlled so that the stretching unit 22 always takes up a double angle of rotation with respect to the frame 32.

The stretching unit 22 also carries a boom 58 on which two deflecting rollers 59 and 60 are rotatably attached. The stretching unit 22 is preferably supported on a support device 61 which rests on the ball bearing ring 23. The ball bearing ring 23 in turn is supported on the platform 24, which is fastened to the tower 30, so that the stretching unit 22 can ultimately be rotated relative to the platform 24 and thus to the tower 30. The lay-flat unit 20 is also non-rotatably arranged on the support device 61.

The described embodiment shows an arrangement for driving a reversing system only by way of example. Further embodiments are conceivable, so that the embodiment described is not to be regarded as limiting the invention.

The invention claimed is:

1. An apparatus for producing tubular films stretched in-line by blow molding comprising an extruder, a film blowing line, a lay-flat unit, an oscillating haul-off unit, and a stretching line for monoaxially stretching the film laid flat in machine direction, wherein the stretching line is arranged above the extruder between the lay-flat unit and the oscillating haul-off unit and, together with the haul-off unit, mounted on a platform situated vertically above the lay-flat unit, the stretching line together with the haul-off unit provided downstream of the same in conveying direction is rotatably mounted on the platform, driving and braking rollers are provided in the stretching line, between the driving and braking rollers in the stretching line, an intermediate circuit coupling is provided for saving energy, and the haul-off unit (25) is rotatably suspended from a traverse (31) of a tower (30).

2. The apparatus according to claim 1, wherein rollers are provided in the stretching line and are designed such that by advance of at least one of the rollers, a stretching force of 100 N to 1000 N can be applied, tempering rollers are provided in the stretching line, and for the tempering rollers in the stretching line, at least two temperature control circuits, including a heating circuit and a cooling circuit, are present, the temperature-controlled rollers have a temperature uniformity of <5° C. across the roller width, and a profile control for a more uniform film thickness across an entire region of the film thickness is provided.

3. The apparatus according to claim 2, wherein on the platform beside the stretching line, electrical converters and/or electric feed components and/or drives are arranged.

4. The apparatus according to claim 2, wherein for a central supply of electricity and water, slip rings and a rotary water lead-through are provided above the platform and/or a communication cable is guided onto the platform as data line.

5. The apparatus according to claim 2, wherein above the platform, observation systems are arranged at various positions.

6. The apparatus according to claim 5, wherein cameras are arranged at various positions above the platform.

7. The apparatus according to claim 2, wherein rollers are provided in the stretching line, the rollers are driven and temperature-controlled individually, and the rollers form at least one stretching nip, wherein the same advantageously is adjustable.

8. The apparatus according to claim 2, wherein rollers are provided in the stretching line and include stretching rollers and non-stretching rollers having different diameters, with the stretching rollers having smaller diameter than the non-stretching rollers.

9. The apparatus according to claim 2, wherein rollers are provided in the stretching line and have a non-stick coating.

10. The apparatus according to claim 2, wherein by the temperature-controlled rollers, the blown film guided through the stretching line is heated up to a temperature which lies at least 10° C. below the glass temperature of tubular film material.

11. The apparatus according to claim 2, wherein nip and non-nip rollers are provided in the stretching line, and which have different surface quality from one another.

12. The apparatus according to claim 2, wherein the temperature-controlled rollers have a temperature uniformity of <1° C. across the roller width.

13. The apparatus according to claim 2, wherein the coupling is an electric coupling.

14. The apparatus according to claim 2, wherein the film blowing line comprises a film blowing head coupled to the extruder and a calibration head situated between the film blowing head and the lay-flat unit.

* * * * *